United States Patent
Jiang et al.

(10) Patent No.: US 11,308,818 B2
(45) Date of Patent: Apr. 19, 2022

(54) METHOD AND APPARATUS FOR OUTPUTTING INFORMATION

(71) Applicant: BEIJING BAIDU NETCOM SCIENCE AND TECHNOLOGY CO., LTD., Beijing (CN)

(72) Inventors: Chao Jiang, Beijing (CN); Xiaohui Li, Beijing (CN); Feifan Fu, Beijing (CN); Wei Zhou, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 251 days.

(21) Appl. No.: 16/721,484

(22) Filed: Dec. 19, 2019

(65) Prior Publication Data
US 2020/0357293 A1    Nov. 12, 2020

(30) Foreign Application Priority Data
May 9, 2019    (CN) .......................... 201910383842.2

(51) Int. Cl.
*G08G 5/06* (2006.01)
*G06Q 10/04* (2012.01)
*G08G 5/00* (2006.01)

(52) U.S. Cl.
CPC ........... *G08G 5/065* (2013.01); *G06Q 10/047* (2013.01); *G08G 5/0026* (2013.01)

(58) Field of Classification Search
CPC .... G08G 5/065; G08G 5/0026; G08G 5/0043; G08G 5/0034; G08G 5/0017;
(Continued)

(56) References Cited

U.S. PATENT DOCUMENTS

2020/0226518 A1* 7/2020 Li .................. G06Q 10/063118

FOREIGN PATENT DOCUMENTS

| JP | 6-214976 A | 8/1994 |
|---|---|---|
| JP | 2000-305981 A | 11/2000 |

(Continued)

OTHER PUBLICATIONS

Balakrishnan, Hamsa, and Yoon Jung. "A framework for coordinated surface operations planning at Dallas-Fort Worth International Airport." AIAA Guidance, Navigation and Control Conference and Exhibit. 2007 (Year: 2007).*

(Continued)

*Primary Examiner* — James J Lee
*Assistant Examiner* — Shon G Foley
(74) *Attorney, Agent, or Firm* — Seed IP Law Group LLP

(57) ABSTRACT

Embodiments of the present disclosure relate to a method and apparatus for outputting information. The method may include: acquiring flight information, airport gate information, taxiway information and a taxiing path; constructing an integer programming model according to the flight information, the airport gate information, the taxiway information and the taxiing path, the integer programming model including a target, a decision variable and a constraint; optimizing the integer programming model according to the constraint; and solving the optimized integer programming model to obtain a corresponding relationship table of flights and airport gates, and outputting the corresponding relationship table.

17 Claims, 6 Drawing Sheets

(58) Field of Classification Search
CPC .. G06Q 10/047; G06Q 10/04; G06Q 10/0631; G06Q 10/067; G06Q 50/30; G06Q 10/06375
See application file for complete search history.

(56) References Cited

FOREIGN PATENT DOCUMENTS

| | | |
|---|---|---|
| JP | 2001-222619 A | 8/2001 |
| JP | 2001-307300 A | 11/2001 |
| JP | 2003-132500 A | 5/2003 |
| JP | 2015-228101 A | 12/2015 |

OTHER PUBLICATIONS

Roling, Paul C., and Hendrikus G. Visser. "Optimal airport surface traffic planning using mixed-integer linear programming." International Journal of Aerospace Engineering 2008 (2008) (Year: 2008).*

Jo et al., "Ramp Activity Expert System for Scheduling and Co-ordination," 1998, 7 pages.

Ryu et al., "A development of an Optimization-Based Flight Scheduler and Its Simulation-Based Application to Real Airports," 2013, 8 pages.

Japanese Decision to Grant a Patent for Japanese Application No. 2019-230877, dated Sep. 14, 2021, 4 pages.

* cited by examiner

METHOD AND APPARATUS FOR OUTPUTTING INFORMATION

CROSS-REFERENCE TO RELATED APPLICATIONS

This application claims priority to Chinese Application No. 201910383842.2, filed on May 9, 2019 and entitled "Method and Apparatus for Outputting Information," the entire disclosure of which is hereby incorporated by reference.

TECHNICAL FIELD

Embodiments of the present disclosure relate to the field of computer technology, and specifically to a method and apparatus for outputting information.

BACKGROUND

An airport gate scheduling algorithm is an algorithm for assigning an airport gate to a flight based on a flight schedule of an airport. A conventional method is that: (1) domestic airports mainly rely on manual scheduling of airport gates for flights according to experience, which consumes a lot of manpower and time; and (2) some airports solve with a greedy algorithm, and the greedy algorithm is gradually abandoned by such airports since the effect of the greedy algorithm does not meet requirements. The mainstream research in the industry mainly focuses on integer programming and heuristic algorithms, and seeks to obtain an optimal solution or a better solution in a short period of time. However, since airport gate scheduling is usually a multi-objective optimization problem which involves complex business problems, no real solution is implemented in a complex system of a large airport.

Airports are currently facing a series of operation safety and operation efficiency problems such as congestions and delays. The root cause of the airport delays is that key scene resources such as airport gates, runways and taxiways are insufficient or not effectively utilized. Therefore, the scientific utilization and rational allocation of existing key scene resources of airports may alleviate the contradiction between the rapid development of the civil aviation industry and the shortage of airport facility resources.

Some variables used in an existing airport gate assignment strategy, such as an accurate walking distance of passengers and time required for boarding and transfer which are difficult to obtain in an actual operation, are likely to cause inaccurate model solving. The ground operation part of a flight area is rarely considered, and the result of assignment is likely to cause runway conflicts, taxiway conflicts and flight delays, thus reducing the ground operation efficiency. At present, the solution to such conflicts mainly relies on manual intervention. Similar conflicts occur frequently in the current situation of the rapid development of the civil aviation industry, busy aviation business and relatively tight airport gates, and it is not enough to rely solely on manual intervention.

SUMMARY

Embodiments of the present disclosure propose a method and apparatus for outputting information.

In a first aspect, an embodiment of the present disclosure provides a method for outputting information, including: acquiring flight information, airport gate information, taxiway information and a taxiing path; constructing an integer programming model according to the flight information, the airport gate information, the taxiway information and the taxiing path, the integer programming model including a target, a decision variable and a constraint; optimizing the integer programming model according to the constraint; and solving the optimized integer programming model to obtain a corresponding relationship table of flights and airport gates, and outputting the corresponding relationship table.

In some embodiments, the method further includes: selecting, in response to receiving an adjustment request of a target flight, several airport gates randomly, and adding the airport gates to a rearrangement list; adding to the rearrangement list, an airport gate that conflicts with the randomly selected airport gates, in the corresponding relationship table of flights and airport gates; constructing a local integer programming model according to airport gate information involved in the arrangement list and related flight information, the taxiway information and the taxiing path; and solving the local integer programming model to obtain an optimal solution within a local range, and updating the corresponding relationship table of flights and airport gates.

In some embodiments, the method further includes: assigning an airport gate to a flight not assigned with an airport gate by means of a greedy algorithm.

In some embodiments, the method further includes: evaluating an effect of the corresponding relationship table of flights and airport gates.

In some embodiments, the decision variable includes at least one of: an identifier for indicating occupation of an airport gate by a flight, a flight push-out conflict identifier, a completion rate of a target bridge docking rate of an airline, a taxiway occupation identifier, a flight attribute, an airport gate attribute, a flight arrival time, a flight departure time, a flight pick-up start time, a flight pick-up end time, a flight drop-off start time, a flight drop-off end time, an identifier of a near airport gate, a number of passengers on board, a pick-up/drop-off conflict identifier, a distance between an airport gate and a runway, an identifier of a temporary airport gate, a target bridge docking rate identifier of an airline or an identifier of a conflicting airport gate.

In some embodiments, the constraint includes at least one of: an attribute constraint, a VIP flight constraint, a space constraint, a time constraint, a conflicting airport gate constraint, a pick-up/drop-off conflict constraint or a push-out conflict constraint.

In some embodiments, the target is a weighted sum of at least one of: a bridge docking rate of a flight, a bridge docking rate of a passenger, a bridge docking completion rate of an airline, a push-out conflict rate, a taxi distance rate, a time usage rate of a near airport gate or a usage rate of a temporary airport gate.

In some embodiments, the optimizing the integer programming model according to the constrain includes at least one of: an airport gate conflict constraint optimization, a push-out conflict constraint optimization, a conflicting airport gate constraint optimization or a piecewise linear transforming bridge docking rate of an airline.

In some embodiments, the solving the optimized integer programming model includes: solving the optimized integer programming model using a branch and bound method.

In a second aspect, an embodiment of the present disclosure provides an apparatus for outputting information, including: an acquisition unit, configured for acquiring flight information, airport gate information, taxiway information and a taxiing path; a constructing unit, configured for constructing an integer programming model according to the flight information, the airport gate information, the taxiway information and the taxiing path, the integer programming model including a target, a decision variable and a constraint; an optimizing unit, configured for optimizing the integer programming model according to the constraint; and a solving unit, configured for solving the optimized integer programming model to obtain a corresponding relationship table of flights and airport gates, and outputting the corresponding relationship table.

In some embodiments, the apparatus further includes an adjustment unit configured for: selecting, in response to receiving an adjustment request of a target flight, several airport gates randomly, and adding the airport gates to a rearrangement list; adding to the rearrangement list, an airport gate that conflicts with the randomly selected airport gates, in the corresponding relationship table of flights and airport gates; constructing a local integer programming model according to airport gate information involved in the arrangement list and related flight information, the taxiway information and the taxiing path; and solving the local integer programming model to obtain an optimal solution within a local range, and updating the corresponding relationship table of flights and airport gates.

In some embodiments, the adjustment unit is further configured for: assigning an airport gate to a flight not assigned with an airport gate by means of a greedy algorithm.

In some embodiments, the apparatus further includes an evaluation unit configured for: evaluating an effect of the corresponding relationship table of flights and airport gates.

In some embodiments, the decision variable includes at least one of: an identifier for indicating occupation of an airport gate by a flight, a flight push-out conflict identifier, a completion rate of a target bridge docking rate of an airline, a taxiway occupation identifier, a flight attribute, an airport gate attribute, a flight arrival time, a flight departure time, a flight pick-up start time, a flight pick-up end time, a flight drop-off start time, a flight drop-off end time, an identifier of a near airport gate, a number of passengers on board, a pick-up/drop-off conflict identifier, a distance between an airport gate and a runway, an identifier of a temporary airport gate, a target bridge docking rate identifier of an airline or an identifier of a conflicting airport gate.

In some embodiments, the constraint includes at least one of: an attribute constraint, a VIP flight constraint, a space constraint, a time constraint, a conflicting airport gate constraint, a pick-up/drop-off conflict constraint or a push-out conflict constraint.

In some embodiments, the target is a weighted sum of at least one of: a bridge docking rate of a flight, a bridge docking rate of a passenger, a bridge docking completion rate of an airline, a push-out conflict rate, a taxi distance rate, a time usage rate of a near airport gate or a usage rate of a temporary airport gate.

In some embodiments, the optimizing the integer programming model according to the constrain includes at least one of: an airport gate conflict constraint optimization, a push-out conflict constraint optimization, a conflicting airport gate constraint optimization or a piecewise linear transforming bridge docking rate of an airline.

In some embodiments, the solving unit is further configured for: solving the optimized integer programming model using a branch and bound method.

In a third aspect, an embodiment of the present disclosure provides an electronic device including: one or more processors; and a storage apparatus, storing one or more programs, where the one or more programs, when executed by the one or more processors, cause the one or more processors to implement the method according to the first aspect.

In a fourth aspect, an embodiment of the present disclosure provides a computer readable medium, storing a computer program thereon, where the computer program, when executed by a processor, implements the method according to the first aspect.

Embodiments of the present disclosure provide a method and apparatus for outputting information which perform mathematical modeling by transforming an airport gate assignment problem into an integer 0-1 programming problem. The scheduling of airport gates is solved from an algorithm level, which may improve the operation efficiency of an airport and the satisfaction of passengers. The mathematical programming may obtain the optimal solution compared to a heuristic algorithm.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
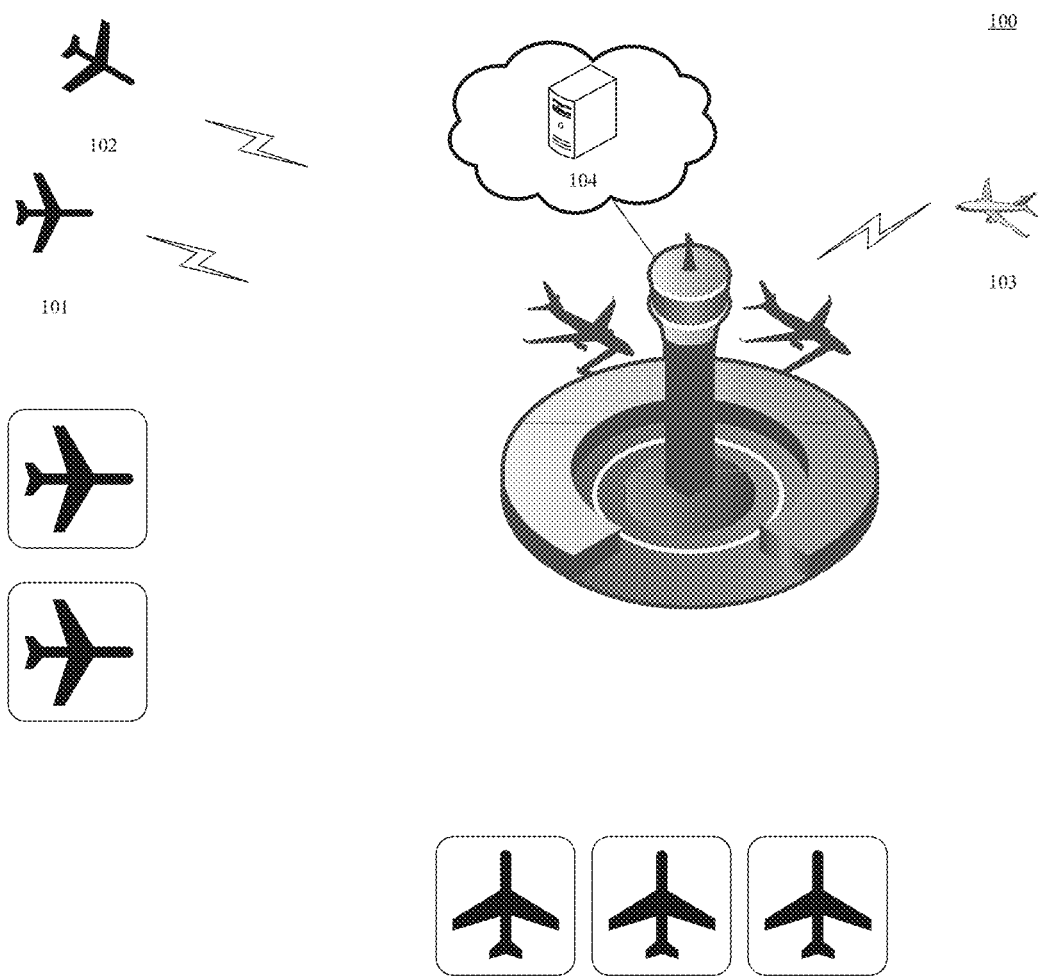
FIG. 1 is diagram of an example system architecture in which an embodiment of the present disclosure may be implemented.

FIG. 1 shows an example system architecture 100 in which a method for outputting information or an apparatus for outputting information according to some embodiments of the present disclosure may be implemented.

As shown in FIG. 1, the system architecture 100 may include aircrafts 101, 102 and 103, and a server 104. A wireless network providing a communication link exists between the aircrafts 101, 102 and 103 and the server 104.

The aircrafts 101, 102 and 103 interact with the server 104 by means of the network so as to receive or transmit messages, or the like.

The server 104 may be mounted in a tower of an airport and is used for controlling aircraft take-off and landing. The server may pre-assign an airport gate to each flight and then notify the flight. If the flight cannot arrive at the airport on time due to delays or cancellations, the aircraft may send an estimated arrival time to the server, and the server then re-adjusts the airport gate assignment. The server may also periodically reassign airport gates based on actual flight arrival time and departure time. The airport gates assigned by the server are divided into remote airport gates and near airport gates. The remote airport gate refers to the airport gate that cannot be boarded directly through a bridge. Generally, passengers take a shuttle bus to an aircraft, and then boards through a passenger bridge. The near airport gate refers to the airport gate that an aircraft directly parks in front of a terminal building, and the terminal building is connected to the aircraft after docking by a bridge, the bridge having no stairs. The bridge is the section connecting the aircraft door at the time of boarding. If the aircraft parks in the remote airport gate, a shuttle bus is required to connect to the terminal building in the airport and the remote aircraft.

It should be noted that the server may be hardware or software. When the server is hardware, the server may be implemented as a distributed server cluster composed of a plurality of servers, or may be implemented as a single server. When the server is software, the server may be implemented as a plurality of software programs or software modules (such as software programs or software modules for providing distributed services), or may be implemented as a single software program or software module, which is not specifically limited herein.

It should be noted that the method for outputting information provided by some embodiments of the present disclosure is generally executed by the server 104, and the apparatus for outputting information is generally provided in the server 104.

It should be understood that the numbers of the aircrafts, networks and servers in FIG. 1 are merely illustrative. Any number of aircraft, networks and servers may be provided based on actual requirements.

Figure 2:
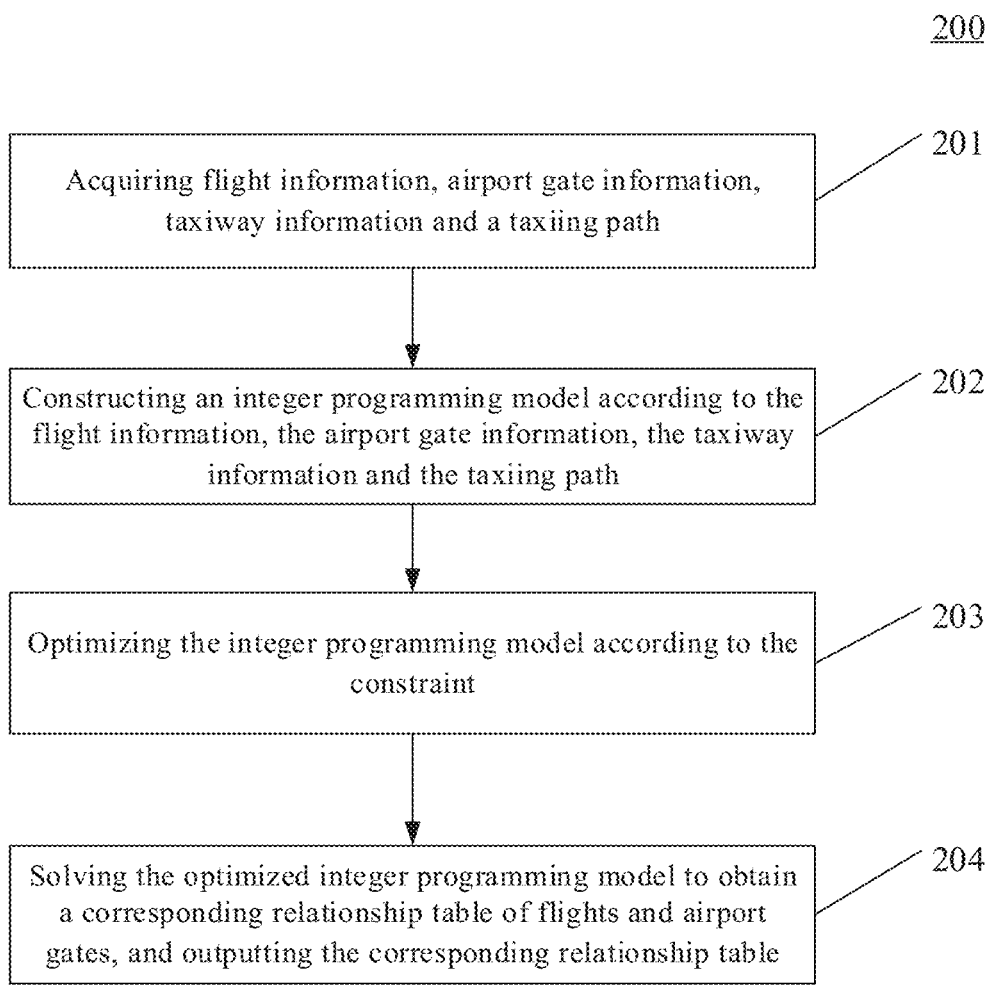
FIG. 2 is a flowchart of a method for outputting information according to an embodiment of the present disclosure.

Further, referring to FIG. 2, a flow 200 of a method for outputting information according to an embodiment of the present disclosure is shown. The method for outputting information comprises the following steps.

Step 201: acquiring flight information, airport gate information, taxiway information and a taxiing path.

In the present embodiment, an execution body (for example, the server shown in FIG. 1) of the method for outputting information may acquire flight information, airport gate information, taxiway information and a taxiing path that are pre-stored. The flight information may include at least one of: an airline, a flight type (an international or domestic flight), an aircraft model, a mission (passenger or cargo), a flight arrival time, a flight departure time, a flight pick-up start time, a flight pick-up end time, a flight drop-off start time or a flight drop-off end time. The airline, the flight type, the aircraft model and the mission are all attributes of a flight. The airport gate information may include at least one of: location (a remote airport gate or a near airport gate), an airport gate type (an international or domestic airport gate), a parkable aircraft model or a use (business or civil aviation). The airport gate information may also be called airport gate attribute. The taxiway information is used to characterize a corresponding relationship between an airport gate and a taxiway. A plurality of airport gates may share one taxiway. The taxiway may be used to slide into an airport gate or to slide out of the airport gate. The taxiway information may be used to determine a push-out conflict. The taxiing path refers to a taxi distance from the airport gate to a runway.

Optionally, a runway operation mode may also be acquired, for example, from east to west. Information such as the taxiing path is adjusted according to the switching of the runway operation mode.

Step 202: constructing an integer programming model according to the flight information, the airport gate information, the taxiway information and the taxiing path.

In the present embodiment, the integer programming means that variables (all or part) in a programming are limited to integers. The integer programming models include a target, a decision variable and a constraint. A special case of the integer programming is the 0-1 programming whose variables are limited to 0 or 1. The contents below is an example of building an integer 0-1 planning problem.

1. Decision Variable

It is assumed that N is the total number of aircrafts (composed of arriving aircrafts and departing aircrafts), M is the total number of airport gates, R is the total number of taxiways and L is the total number of airlines. Then i∈ [0, N], j∈ [0, M], k∈ [0, R], l∈ [0, L], (1), (2) and (3) are the finally required variables, and variable in (4) belongs to an invariable constant that may be solved in advance.

(1) An airport gate j occupied by a flight i is expressed as follows.

$X_{i,j}$ is used to represent an identifier for indicating occupation of an airport gate by a flight. A value of 1 indicates occupation and a value of 0 indicates no occupation.

(2) Whether the flight i conflicts with other flights is expressed as follows.

Zi is used to represent a flight push-out conflict identifier. A value of 1 indicates a conflict, and a value of 0 indicates no conflict. A push-out conflict refers to that a flight hinders the push-out of another flight or flight delays occur due to the push-out of another flight.

(3) $B_1$ indicates a completion rate of a target bridge docking rate of an airline 1.

When the bridge docking rate $B_1$ of an airline is between a lower limit and an upper limit of the target bridge docking rate, the value of the completion rate is 1. When the bridge docking rate is less than the lower limit or greater than the upper limit, the value of the completion rate is a real number less than 1. The bridge docking rate of a flight means the probability that a flight docks beside a bridge of a terminal building and passengers board the aircraft directly from a boarding gate without taking a shuttle bus.

(4) $YIN_{j,k}$ indicates whether the airport gate j occupies a slide-in taxiway k; $YOUT_{j,k}$ indicates whether the airport gate j occupies a slide-out taxiway k; P_i indicates the attribute of the flight i, and P_j indicates an attribute required by the airport gate; $tin_i$ indicates the arrival time of the flight i, and $out_i$ indicates the departure time of the flight i; $t\_p\_in\_s_i$ indicates a pick-up start time, $t\_p\_in\_e_i$ indicates a pick-up end time, $t\_p\_out\_s_i$ indicates a drop-off start time, and $t\_p\_out\_e_i$ indicates a drop-off end time; $b_j$ indicates whether the airport gate j is a near airport gate; $p_i$ indicates the number of passengers in the flight i; $BC_{i1,i2,i3}$ indicates whether a flight i3 cannot drop off passengers when flights $i_1$ and $i_2$ pick up passengers at the same time; $d_j$ indicates a distance from the airport gate j to the runway; $t_j$ indicates whether the airport gate j is a temporary airport gate; $T_1$ indicates whether the airline has set a target bridge docking rate of the airline; and $C_{j1,j2}$ indicates whether airport gates j1 and j2 are conflicting airport gates (for example, father and son airport gates).

2. Constraint (1) Attribute constraint: international and domestic attribute constraints (requirements of an airport gate for an international and domestic attribute of a flight), a task constraint (requirements of the airport gate for the flight), an airline constraint (requirements of the airport gate for an airline of the flight) and an aircraft model constraint (requirements of the airport gate for the size of an aircraft)

$X_{i,j}=0$, if $P_j$ notmatch $P_i$, $\forall i \in [0,N-1]$, $\forall j \in [0,M-1]$, that is, the attribute of the flight does not match the attribute of the aircraft. For example, a domestic flight cannot be parked in an international airport gate.

(2) VIP flight constraint $\Sigma_{j=0}^{M-1} X_{i,j} b_j = 1$, here, the i represents a VIP flight, $\forall j \in [0,M-1]$, and the VIP refers to a very important person.

(3) Each flight may only be arranged to one airport gate (space constraint)

$\Sigma_{j=0}^{M-1} X_{i,j} = 1, \forall i \in [0,N-1], \forall j \in [0,M-1]$, (4) Only one flight may be parked in an airport gate at the same time (time constraint). The following formula cannot be established at the same time:

$(tin_{i1}-tout_{i2})*(tin_{i2}-tout_{i1})>0$ $X_{i1,j}=1, X_{i2,j}=1$ $\forall i_1, i_2 \in [0,N-1], \forall j \in [0,M-1]$, (5) Conflicting airport gates cannot be used at the same time. The formula below cannot be established at the same time:

$(tin_{i1}-tout_{i2})*(tin_{i2}-tout_{i1})>0$ $C_{j1,j2}=1$ $X_{i1,j1}=1, X_{i2,j2}=1$ $\forall i_1, i_2 \in [0,N-1], \forall j_1, j_2 \in [0,M-1]$ A typical situation of the conflicting airport gates is father and son airport gates. A father airport gate may consist of more than two son airport gates. If the son airport gate is assigned to a flight, the son airport gate may conflict with the father airport gate, and the father airport gate may not be assigned to a flight. Similarly, after the father airport gate is assigned to a flight, a flight cannot be assigned to the son airport gate. However, there is no conflict between the son airport gates.

(6) Pick-up/drop-off conflict constraint. The formula below may not be established at the same time:

$(t\_P\_in\_s_{i1}-t\_p\_in\_e_{i2})*(t\_p\_in\_s_{i2}-t\_p\_in\_e_{i1})>0$ $(t\_p\_in\_s_{i1}-t\_p\_out\_e_{i3})*(t\_p\_out\_s_{i3}-t\_p\_in\_e_{i1})>0$ $(t\_p\_in\_s_{i2}-t\_p\_out\_e_{i3})*(t\_p\_out\_s_{i3}-t\_p\_in\_e_{i2})>0$ $BC_{i1,i2,i3}=1$, $\forall i_1, i_2, i_3 \in [0,N-1]$ (7) Taxiway push-out conflict constraint. Zi1,Zi2 represent a pair of push-out conflict flights i1 and i2.

Conflict between slide in of flight i1 and slide out of flight i2:

$Z_{i1} \geq (X_{i1,j1} YIN_{j1,k})*(X_{i2,j2} YOUT_{j2,k})*\text{conflict\_flight\_in\_out}_{i1,i2}$ $Z_{i2} \geq (X_{i1,j1} YIN_{j1,k})*(X_{i2,j2} YOUT_{j2,k})*\text{conflict\_flight\_in\_out}_{i1,i2}$ Conflict between slide out of flight i1 and slide in of flight i2:

$Z_{i1} \geq (X_{i1,j1} YOUT_{j1,k})*(X_{i2,j2} YIN_{j2,k})*\text{conflict\_flight\_out\_in}_{i1,i2}$ $Z_{i2} \geq (X_{i1,j1} YOUT_{j1,k})*(X_{i2,j2} YIN_{j2,k})*\text{conflict\_flight\_out\_in}_{i1,i2}$ Conflict between slide out of flight i1 and slide out of flight i2:

$Z_{i1} \geq (X_{i1,j1} YOUT_{j1,k})*(X_{i2,j2} YOUT_{j2,k})*\text{conflict\_flight\_out\_out}_{i1,i2}$ $Z_{i2} \geq (X_{i1,j1} YOUT_{j1,k})*(X_{i2,j2} YOUT_{j2,k})*\text{conflict\_flight\_out\_out}_{i1,i2}$ conflict_flight_in_out$_{i1,i2}$ is used to represent the conflict between the slide in time of the flight i1 and the slide out time of the flight i2.

conflict_flight_out_in$_{i1,i2}$ is used to represent the conflict between the slide out time of the flight i1 and the slide in time of the flight i2.

conflict_flight_out_out$_{i1,i2}$ is used to represent the conflict between the slide out time of the flight i1 and the slide out time of the flight i2.

$\forall i_1, i_2 \in [0,N-1], \forall j_1, j_2 \in [0,M-1]$

3. Target (1) Bridge docking rate of a flight:

$$\frac{\sum_{i=0}^{N-1} \sum_{j=0}^{M-1} X_{i,j} b_j}{N}$$

(2) Bridge docking rate of a passenger:

$$\frac{\sum_{i=0}^{N-1} \sum_{j=0}^{M-1} X_{i,j} b_j p_i}{\sum_{i=0}^{N-1} p_i}$$

(3) Bridge docking completion rate of an airline:

$$\frac{\sum_{l=0}^{L-1} B_l T_l}{\sum_{l=0}^{L-1} T_l}$$

(4) Push-out conflict rate:

$$\frac{\sum_{i=0}^{N-1} Z_i}{N}$$

(5) Taxi distance rate:

$$\frac{\sum_{i=0}^{N-1} \sum_{j=0}^{M-1} X_{i,j} d_j}{N * Constant1}$$

Constant1 here is a preset maximum distance.
(6) Time usage rate of a near airport gate:

$$\frac{\sum_{i=0}^{N-1} \sum_{j=0}^{M-1} X_{i,j} b_j * (tout_i - tin_i)}{\sum_{j=0}^{M-1} b_j * Constant2}$$

Constant2 is a preset duration, for example, 24 hours.
(7) Usage rate of a temporary airport gate:

$$\frac{\sum_{i=0}^{N-1} \sum_{j=0}^{M-1} X_{i,j} t_j}{N}$$

In summary, a target function is designed as follows:

$$h(x) = w1 * \frac{\sum_{i=0}^{N-1} \sum_{j=0}^{M-1} X_{i,j} b_j}{N} + w2 * \frac{\sum_{i=0}^{N-1} \sum_{j=0}^{M-1} X_{i,j} b_j p_i}{\sum_{i=0}^{N-1} p_i} +$$

$$w3 * \frac{\sum_{i=0}^{L-1} B_1 T_1}{\sum_{i=0}^{L-1} T_1} + w4 * \frac{\sum_{i=0}^{N-1} Z_i}{N} + w5 * \frac{\sum_{i=0}^{N-1} \sum_{j=0}^{M-1} X_{i,j} d_j}{N * Constant} +$$

$$w6 * \frac{\sum_{i=0}^{N-1} \sum_{j=0}^{M-1} X_{i,j} b_j * (tout_i - tin_i)}{\sum_{j=0}^{M-1} b_j * Constant} + w7 * \frac{\sum_{i=0}^{N-1} \sum_{j=0}^{M-1} X_{i,j} t_j}{N}$$

A final target is a corresponding relationship between a flight and an airport gate when max (h (x)) is solved.

Step 203: optimizing the integer programming model according to the constraint.

In the present embodiment, a branch and bound method is usually used to solve the integer programming. Here, the model is optimized from the following two perspectives.

(1) A reduced constraint. If a plurality of constraints may be combined into one constraint, the speed of solving linear programming may be increased to a certain extent, and a memory may be reduced.

(2) A tighter boundary. If constraint a and constraint b are equivalent under an integer programming model, the constraint b may be deduced from the constraint a and the constraint a cannot be deduced from the constraint b under the linear programming model, the constraint a is tighter than the constraint b. For example, a+b<=1, a+c<=1, and b+c<=1. When the a, b and c are integers from 0 to 1, a+b+c<=1 can be obtained. Such optimization will be looked up from the two perspectives above. From the first perspective, the constraints have changed from 3 to 1, which is conducive to linear programming. From the second perspective, if a, b, and c are real numbers, the later one cannot be deduced from the first three constraints. If the a+b+c<=1 is used to describe the problem, a distance between a linear programming solution and an integer programming solution may be smaller than the previous one, which will be beneficial to the solution of the integer programming. Therefore, such optimization may not only improve the speed of the linear programming, but also reduce the difficulty in finding an integer solution.

The specific optimization steps are as follows.

Figure 3A:
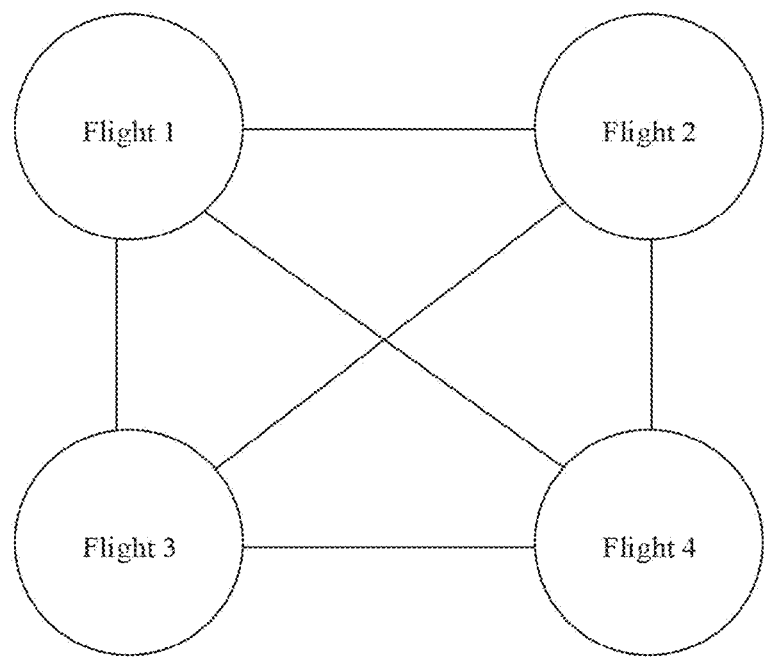
FIG. 3a and FIG. 3b are schematic diagrams of an airport gate conflict constraint optimization of a method for outputting information according to an embodiment of the present disclosure.

(1) Airport gate conflict constraint optimization: Taking an airport gate conflict constraint as an example, only one flight may be parked in one airport gate at the same time, so two flights that intersect in time cannot be parked in the same airport gate. These conflicting flights actually form some loops, such as flight 1 and flight 2 have time conflict, flight 1 and flight 3 have time conflict, flight 1 and flight 4 have time conflict, flight 2 and flight 3 have time conflict, flight 2 and flight 4 have time conflict and flight 3 and flight 4 have time conflict, that is, a complete graph (as shown in FIG. 3a) is formed, and edges thereof represent conflicts.

Therefore, the constraints may be converted into that only one of the flight 1, flight 2, flight 3 and flight 4 may be parked in an aircraft gate, and the number is reduced from 6 to 1. How to find the largest complete subgraph of each flight in the figure becomes an NPC (non-deterministic polynomial complete) problem. Therefore, the optimization is continued and observed in a time dimension. If there are several flights having time conflict at a certain moment, only one of these flights may be allowed to park in a certain airport gate. Keep scrolling forward according to the time axis to keep getting a new conflicting flight group, and the preceding small conflicting flight group is deleted. For example, if it is first found that the flight 1 and flight 2 conflict, the two flights are added to a conflict group; and then it is found that the flight 1, flight 2 and flight 3 conflict simultaneously, and the former conflict group is a subset of the latter group. The conflict group composed of the flight 1 and flight 2 is deleted, only the current largest conflict group is kept, and an iteration is performed.

Figure 3B:
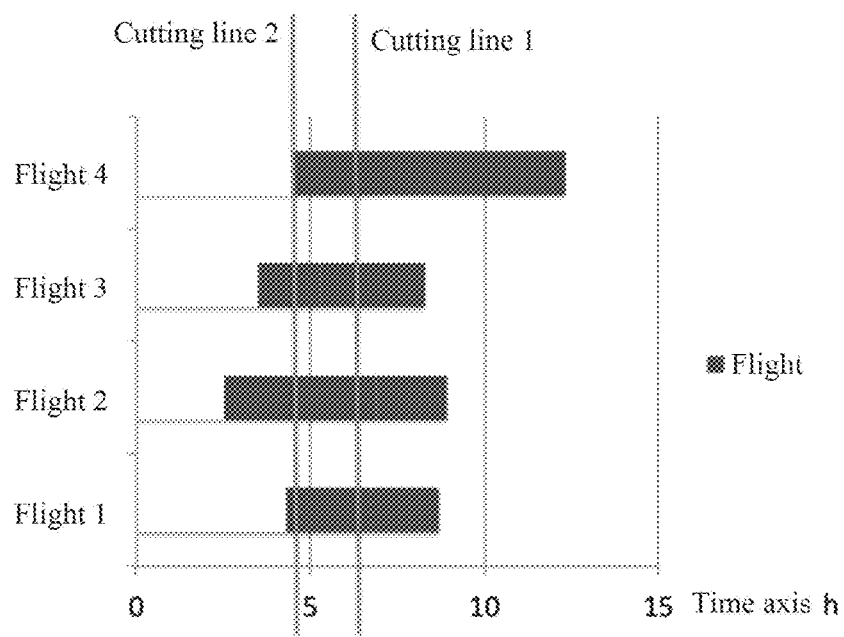

As shown in FIG. 3b, cutting is performed according to the time axis, and the cut flights form a conflict group. For example, a cutting line 1 may generate a conflict group <flight 1, flight 2, flight 3, flight 4>. At the same time, it may be reasoned that if there is a cutting line that may generate a conflict group, there must be a cutting line that passes through a start moment of a flight in the conflict group, and the same conflict group may be obtained. As described above, the cutting line 1 may get a conflict group <flight 1, flight 2, flight 3, flight 4>, there must be a cutting line (the cutting line 2 in the present example) that passes through the start moment of a certain flight (the flight 4 in the present example), and the same conflict group may be obtained.

Before optimization, the airport gate conflict constraint of flight i1 is $X_{i1,j1}+X_{i2,j1}<=1$; $X_{i1,j1}+X_{i3,j1}<=1$; $X_{i1,j1}+X_{i4,j1}<=1$.

After optimization, the constraint is reduced to $X_{i1,j1}+(X_{i2,j1}+X_{i3,j1}+X_{i4,j1})/3<=1$.

Based on the reasoning obtained by combining with an airport business, it is only needed to traverse the arrival time of each flight as a cutting line to find a conflict group, and the time complexity is reduced by an order of magnitude.

(2) Push-out conflict constraint optimization is as follows.

The push-out conflict may also be observed from the time dimension. Flights that occupy the same taxiway to push in and push out at the same time may generate a push-out conflict with each other. These push-out conflict constraints may also be combined to reduce the constraints.

For example: if flight i1 is parked in the airport gate j1, flight i2 is parked in the airport gate j2 and flight i3 is parked in the airport gate j3, the flights i1, i2 and f3 overlap in the push-in or push-out time, and the airport gates j1, j2 and j3 occupy the same taxiway k. Therefore, for the conflict judgment of the flight i1, there may be several different formulas such as $Z_{i1}+1>=X_{i1,j1}+X_{i2,j2}$, $Z_{i1}+1>=X_{i1,j1}+X_{i3,j3}$. Actually, such formulas may be reduced to one: $Z_{i1}+1>=X_{i1,j1}+(X_{i2,j2}$ or $X_{i3,j3}$ or ...).

That is to say, as long as one of the docking schemes of $X_{i2,j2}$ or $X_{i3,j3}$ is established, a flight occupies the same taxiway k as the flight i1, and such flight has a conflict with the flight i1 in terms of taxiway. The or calculation here may be written as:

$$Z_{i1}+1>=X_{i1,j1}+(X_{i2,j2}+X_{i3,j3}+\ldots)/n$$

Here, $Z_{i1}$, $X_{i1,j1}$, $X_{i2,j2}$, $X_{i3,j3}$ ... are 0-1 variables, $Z_{i1}$ means that the flight i1 generates a push-out conflict, and n is the number of numerators. In this formula, if $X_{i1,j1}$ is 1, and any one of the variables such as $X_{i2,j2}$ or $X_{i3,j3}$ in the parentheses is 1, $Z_{i1}$ must be 1. Even if the variables such as $X_{i2,j2}$ and $X_{i3,j3}$ are all 1, $Z_{i1}$ is 1. As long as n is greater than or equal to the number of subsequent variables, the formula is true. If n is set as the number of variables, the bound of the inequation may be tighter.

Further, a flight may occupy one taxiway each time when the flight enters an airport gate or slides out of the airport gate, so the variables of two taxiway occupations may be combined and placed in the item "or" in the inequation.

(3) Conflicting airport gate (such as father and son airport gates) constraint optimization is as follows.

The conflicting airport gate constraint is similar to the airport gate conflict constraint of a flight. The airport gate conflict constraint of a flight means that flights having time conflict are parked in the same airport gate, and the conflicting airport gate constraint means that the flights having time conflict are parked in conflicting airport gates.

It is assumed that the flight i1 have time conflict with flights i2, i3 and i4, the airport gate j1 conflicts with airport gates j2, j3 and j4, j1 is a father airport gate and j2-j4 are son airport gates.

Before optimization, the conflicting airport gate constraint of flight i1 is $X_{i1,j1}+X_{i2,j2}<=1$; $X_{i1,j1}+X_{i3,j3}<=1$; $X_{i1,j1}+X_{i4,j4}<=1$.

After optimization, the constraints are reduced to one, that is, $X_{i1,j1}+(X_{i2,j2}+X_{i3,j3}+X_{i4,j4})/3<=1$.

(4) Piecewise linear transforming bridge docking rate of an airline: the bridge docking rate of an airline is a non-linear index. When the rate is less than a set interval, the same may be rewarded to continue to increase; and when the rate is greater than the set interval, the same may be punished and reduced. In the end, a set target is achieved only when the bridge docking rate is within a set bridge docking rate interval. In order to optimize the problem, nonlinearity is converted into piecewise linearity so as to simplify a model solving process.

Step 204: solving the optimized integer programming model to obtain a corresponding relationship table of flights and airport gates, and outputting the corresponding relationship table.

In the present embodiment, a common method for solving the integer programming model is a branch and bound method, and there are some special methods for solving various special problems, for example, it is convenient to solve an assignment problem using a Hungarian method. The branch and bound method is the most commonly used algorithm for solving an integer programming problem. This method may not only solve a pure integer programming problem, but also solve a mixed integer programming problem. The branch and bound method is a search and iterative method, and selects different branch variables and subproblems for branching.

According to the method provided by some embodiments of the present disclosure, a non-linear index is converted into piecewise linearity by integrating a plurality of targets in an actual business of an airport into an integer programming model. The model is optimized to find an optimal solution within 5 minutes.

Figure 4:
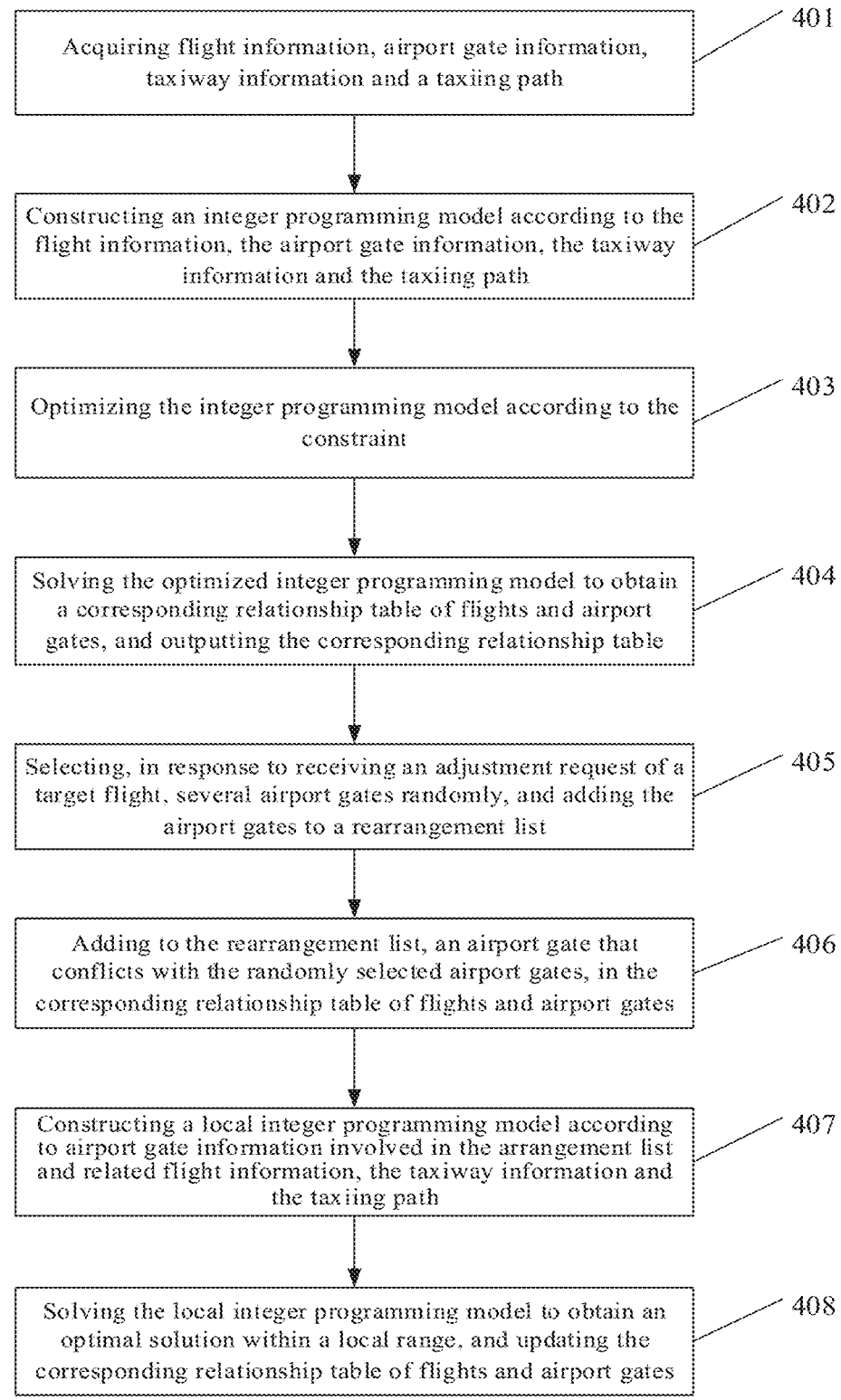
FIG. 4 is a flowchart of a method for outputting information according to another embodiment of the present disclosure.

Further referring to FIG. 4, a flow 400 of a method for outputting information according to another embodiment is shown. The flow 400 of the method for outputting information comprises the following steps.

Step 401: acquiring flight information, airport gate information, taxiway information and a taxiing path.

Step 402: constructing an integer programming model according to the flight information, the airport gate information, the taxiway information and the taxiing path.

Step 403: optimizing the integer programming model according to the constraint.

Step 404: solving the optimized integer programming model to obtain a corresponding relationship table of flights and airport gates, and outputting the corresponding relationship table.

Steps 401-404 are basically consistent with steps 201-204, and will not be repeated here.

Step 405: selecting, in response to receiving an adjustment request of a target flight, several airport gates randomly, and adding the airport gates to a rearrangement list.

In the present embodiment, the adjustment request includes a list V of flights to be adjusted and a list P of airport gates in which the flights to be adjusted are parked, that is, a rearrangement list. Some airport gates are randomly selected from existing airport gates to add to the list P.

Step 406: adding to the rearrangement list, an airport gate that conflicts with the randomly selected airport gates, in the corresponding relationship table of flights and airport gates.

In the present embodiment, each node in the P is traversed to find conflicting airport gates assigned in the corresponding relationship table of flights and airport gates, such as father and son conflicting airport gates, an airport gate conflicting in time, an airport gate conflicting in space, and an airport gate conflicting in pick-up/drop-off. If these conflicting airport gates are not in the P, such gates are added to the P. The resulting P is a list of all airport gates to be adjusted locally. A connected graph of associated airport gates may be constructed in advance according to the affected airport gates and the randomly selected airport gates, thereby facilitating the determination of the conflicting airport gates.

Step 407: constructing a local integer programming model according to airport gate information involved in the arrangement list and related flight information, the taxiway information and the taxiing path.

In the present embodiment, airport gate information involved in the arrangement list obtained in step 406 and flight information of flights to which these airport gates have already been assigned are obtained, and a local integer programming model is constructed using the taxiway information and the taxiing path again. The specific process is the same as step 202, and therefore will not be described again.

Step 408: solving the local integer programming model to obtain an optimal solution within a local range, and updating the corresponding relationship table of flights and airport gates.

In the present embodiment, the branch and bound method is also used to solve the local integer programming model so as to obtain an optimal solution within a local range. Then, the corresponding relationship table of flights and airport gates generated in step 204 is compared to update changed contents.

In some optional implementations of the present embodiment, some flights may not be assigned with an airport gate. Finally, the flights not assigned with an airport gate are scheduled by means of a greedy algorithm until such flights are assigned with certain airport gates, then a real-time adjustment ends and the entire real-time adjustment process may be completed within 5 seconds. The greedy algorithm means to always make the best choice at the moment when solving a problem, that is to say, what is doing is a local optimal solution in a certain sense instead of considering the overall optimality.

As may be seen from FIG. 4, the flow 400 of the method for outputting information in the present embodiment embodies the adjusting of the airport gate in real time as compared with the embodiment corresponding to FIG. 2. Therefore, the solution described in the present embodiment designs a real-time adjustment strategy by using the idea of integrating greedy and programming, including constructing a list of airport gates to be locally adjusted using the connected graph of associated airport gates, so that the entire real-time adjustment may be completed within 5 seconds.

In some optional implementations of the present embodiment, the method further comprises: evaluating an effect of the corresponding relationship table of flights and airport gates. Overnight flights on T day are initialized to schedule the flights on the T+1 day. The comparison with actual monthly manual scheduling data of a large airport is as follows:

|  | Manual assignment | Automatic assignment |
|---|---|---|
| Monthly average bridge docking rate | 72.2% | 82.5% |
| Monthly average bridge docking rate of passenger | 74.0% | 83.8% |
| Airport gate conflict rate | 2.1% | 0 |
| Push-out conflict rate | 6.4% | 2% |
| Usage rate of temporary airport gate | 0 | 0 |

Figure 5:
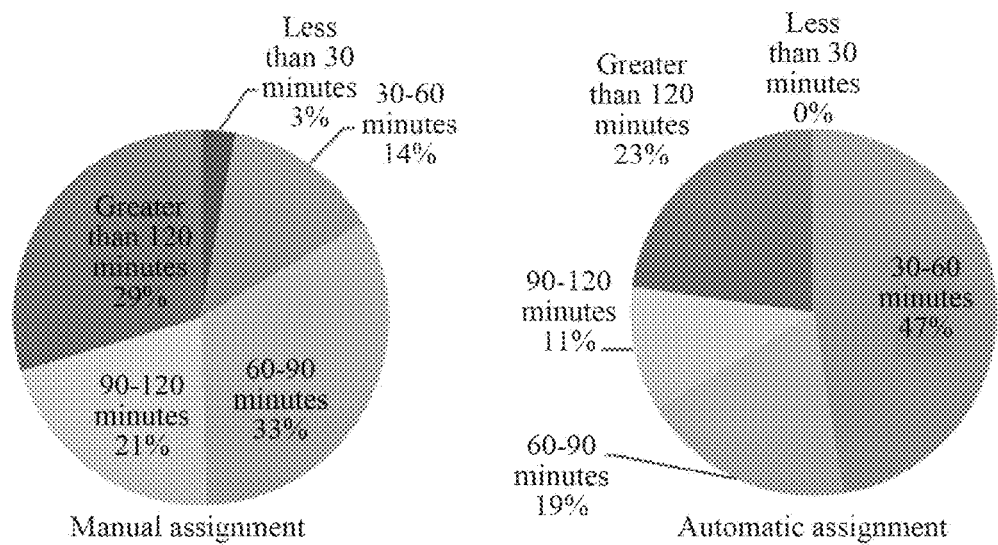
FIG. 5 is a diagram illustrating an effect of a method for outputting information according to an embodiment of the present disclosure.

Flight interval distribution of a near airport gate is subject to statistics and comparison, as shown in FIG. 5.

Hence, we may see from the time interval distribution of a near airport gate that the polarization (maximin) of the distribution of flight intervals obtained by manual assignment is much more serious than the automatic assignment, which wastes the near airport gates. After automatic assignment, some too long flight intervals of near airport gates are significantly reduced, so that the near airport gates are more fully utilized.

By comparing the effects of historical data obtained within several months, key indexes have been increased, the bridge docking rate has increased by 10%, the bridge docking rate of passenger has increased by 10% and conflict rate indexes have also dropped significantly, compared with manual assignment results.

Figure 6:
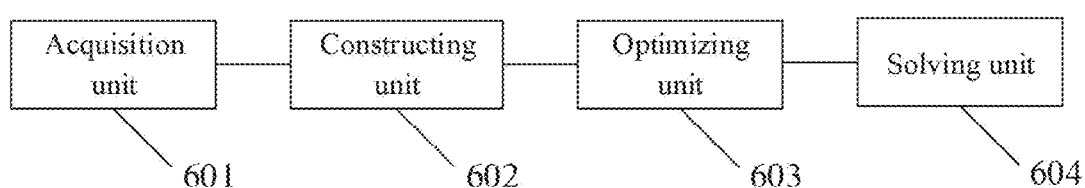
FIG. 6 is a schematic structural diagram of an apparatus for outputting information according to an embodiment of the present disclosure.

Further referring to FIG. 6, as an implementation of the method shown in each figure, an embodiment of the present disclosure provides an apparatus for outputting information. The apparatus embodiment may correspond to the method embodiment shown in FIG. 2, and the apparatus may be specifically applied to various electronic devices.

As shown in FIG. 6, the apparatus 600 for outputting information according to the present embodiment comprises an acquisition unit 601, a constructing unit 602, an optimizing unit 603 and a solving unit 604. The acquisition unit 601 is configured for acquiring flight information, airport gate information, taxiway information and a taxiing path; the constructing unit 602 is configured for constructing an integer programming model according to the flight information, the airport gate information, the taxiway information and the taxiing path, the integer programming model comprising a target, a decision variable and a constraint; the optimizing unit 603 is configured for optimizing the integer programming model according to the constraint; and the solving unit 604 is configured for solving the optimized integer programming model to obtain a corresponding relationship table of flights and airport gates, and outputting the corresponding relationship table.

In the present embodiment, for the specific processing of the acquisition unit 601, the constructing unit 602, the optimizing unit 603 and the solving unit 604 of the apparatus 600 for outputting information, refer to steps 201, 202, 203 and 204 in the embodiment corresponding to FIG. 2 respectively.

In some optional implementations of the present embodiment, the apparatus 600 further comprises an adjustment unit (not shown) configured for: selecting, in response to receiving an adjustment request of a target flight, several airport gates randomly, and adding the airport gates to a rearrangement list; adding to the rearrangement list, an airport gate that conflicts with the randomly selected airport gates, in the corresponding relationship table of flights and airport gates; constructing a local integer programming model according to airport gate information involved in the arrangement list and related flight information, the taxiway information and the taxiing path; and solving the local integer programming model to obtain an optimal solution within a local range, and updating the corresponding relationship table of flights and airport gates.

In some optional implementations of the present embodiment, the adjustment unit is further configured for assigning an airport gate to a flight not assigned with an airport gate by means of a greedy algorithm.

In some optional implementations of the present embodiment, the apparatus 600 further comprises an evaluation unit (not shown) configured for evaluating an effect of the corresponding relationship table of flights and airport gates.

In some optional implementations of the present embodiment, the decision variable comprises at least one of: an identifier for indicating occupation of an airport gate by a flight, a flight push-out conflict identifier, a completion rate of a target bridge docking rate of an airline, a taxiway occupation identifier, a flight attribute, an airport gate attribute, a flight arrival time, a flight departure time, a flight pick-up start time, a flight pick-up end time, a flight drop-off start time, a flight drop-off end time, an identifier of a near airport gate, a number of passengers on board, a pick-up/drop-off conflict identifier, a distance between an airport gate and a runway, an identifier of a temporary airport gate, a target bridge docking rate identifier of an airline or an identifier of a conflicting airport gate.

In some optional implementations of the present embodiment, the constraint comprises at least one of: an attribute constraint, a VIP flight constraint, a space constraint, a time constraint, a conflicting airport gate constraint, a pick-up/drop-off conflict constraint or a push-out conflict constraint.

In some optional implementations of the present embodiment, the target is a weighted sum of at least one of: a bridge docking rate of a flight, a bridge docking rate of a passenger, a bridge docking completion rate of an airline, a push-out conflict rate, a taxi distance rate, a time usage rate of a near airport gate or a usage rate of a temporary airport gate.

In some optional implementations of the present embodiment, the optimizing the integer programming model according to the constrain comprises at least one of: an airport gate conflict constraint optimization, a push-out conflict constraint optimization, a conflicting airport gate constraint optimization or a piecewise linear transforming bridge docking rate of an airline.

In some optional implementations of the present embodiment, the solving unit is further configured for solving the optimized integer programming model using a branch and bound method.

Figure 7:
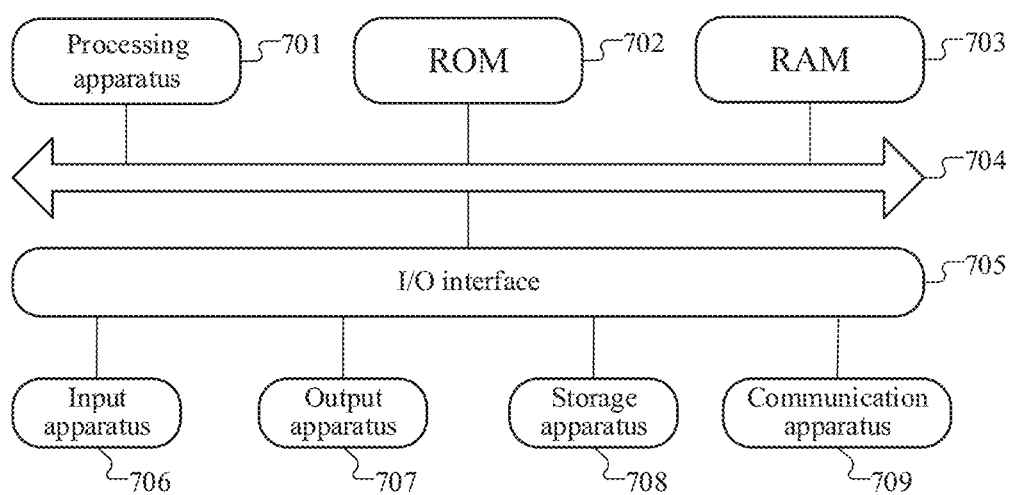
FIG. 7 is a schematic structural diagram of a computer system adapted to implement an electronic device according to embodiments of the present disclosure.

Referring to FIG. 7 below, a schematic structural diagram of an electronic device (e.g., the server in FIG. 1) 700 adapted to implement some embodiments of the present disclosure is shown. The electronic device shown in FIG. 7 is merely an example, and should not limit the functions and scope of use of embodiments of the present disclosure.

As shown in FIG. 7, the electronic device 700 may include a processing apparatus (e.g., a central processing apparatus, or a graphics processor) 701, which may execute various appropriate actions and processes in accordance with a program stored in a read only memory (ROM) 702 or a program loaded into a random access memory (RAM) 703 from a storage apparatus 708. The RAM 703 further stores various programs and data required by operations of the electronic device 700. The processing apparatus 701, the ROM 702, and the RAM 703 are connected to each other through a bus 704. An input/output (I/O) interface 705 is also connected to the bus 704.

Generally, the following apparatuses may be connected to the I/O interface 705: an input apparatus 706 including a touch screen, a touch pad, a keyboard, a mouse, a camera, a microphone, an accelerometer, a gyroscope, or the like; an output apparatus 707 including a liquid crystal displayer (LCD), a speaker, a vibrator, or the like; a storage apparatus 708 including a tape, a hard disk, or the like; and a communication apparatus 709. The communication apparatus 709 may allow the electronic device 700 to exchange data with other devices through wireless or wired communication. While FIG. 7 shows the electronic device 700 having various apparatuses, it should be understood that it is not necessary to implement or provide all of the apparatuses shown in the figure. More or fewer apparatuses may be alternatively implemented or provided. Each block shown in FIG. 7 may represent an apparatus, or represent a plurality of apparatuses as required.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 709, or may be installed from the storage apparatus 708, or may be installed from the ROM 702. The computer program, when executed by the processing apparatus 701, implements the above functions defined by the methods of some embodiments of the present disclosure. It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be included in the electronic device, or a stand-alone computer readable medium without being assembled into the electronic device. The computer readable medium stores one or more programs. The one or more programs, when executed by the electronic device, cause the electronic device to: acquiring flight information, airport gate information, taxiway information and a taxiing path; constructing an integer programming model according to the flight information, the airport gate information, the taxiway information and the taxiing path, the integer programming model comprising a target, a decision variable and a constraint; optimizing the integer programming model according to the constraint; and solving the optimized integer programming model to obtain a corresponding relationship table of flights and airport gates, and outputting the corresponding relationship table.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software or hardware. The described units may also be provided in a processor, for example, described as: a processor including an acquisition unit, a constructing unit, an optimizing unit, and a solving unit. The names of the units do not constitute a limitation to such units themselves in some cases. For example, the acquisition unit may be further described as "a unit configured to acquire flight information, airport gate information, taxiway information and a taxiing path."

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for outputting information, comprising:
    acquiring flight information, airport gate information, taxiway information and a taxiing path;
    constructing an integer programming model according to the flight information, the airport gate information, the taxiway information and the taxiing path, the integer programming model comprising a target, a decision variable and a constraint;
    optimizing the integer programming model according to the constraint;
    solving the optimized integer programming model to obtain a corresponding relationship table of flights and airport gates, and outputting the corresponding relationship table;
    selecting, in response to receiving an adjustment request of a target flight, several airport gates randomly, and adding the airport gates to a rearrangement list;
    adding to the rearrangement list, an airport gate that conflicts with the randomly selected airport gates, in the corresponding relationship table of flights and airport gates;
    constructing a local integer programming model according to airport gate information involved in the arrangement list and related flight information, the taxiway information and the taxiing path;
    solving the local integer programming model to obtain an optimal solution within a local range, and updating the corresponding relationship table of flights and airport gates; and
    adjusting a position of an aircraft in the airport according to the updated corresponding relationship table.

2. The method according to claim 1, further comprising:
    assigning an airport gate to a flight not assigned with an airport gate by means of a greedy algorithm.

3. The method according to claim 1, further comprising:
    evaluating an effect of the corresponding relationship table of flights and airport gates.

4. The method according to claim 1, wherein the decision variable comprises at least one of:
    an identifier for indicating occupation of an airport gate by a flight, a flight push-out conflict identifier, a completion rate of a target bridge docking rate of an airline, a taxiway occupation identifier, a flight attribute, an airport gate attribute, a flight arrival time, a flight departure time, a flight pick-up start time, a flight pick-up end time, a flight drop-off start time, a flight drop-off end time, an identifier of a near airport gate, a number of passengers on board, a pick-up/drop-off conflict identifier, a distance between an airport gate and a runway, an identifier of a temporary airport gate, a target bridge docking rate identifier of an airline or an identifier of a conflicting airport gate.

5. The method according to claim 4, wherein the constraint comprises at least one of:
    an attribute constraint, a VIP flight constraint, a space constraint, a time constraint, a conflicting airport gate constraint, a pick-up/drop-off conflict constraint or a push-out conflict constraint.

6. The method according to claim 5, wherein the target is a weighted sum of at least one of:
    a bridge docking rate of a flight, a bridge docking rate of a passenger, a bridge docking completion rate of an airline, a push-out conflict rate, a taxi distance rate, a time usage rate of a near airport gate or a usage rate of a temporary airport gate.

7. The method according to claim 5, wherein the optimizing the integer programming model according to the constrain comprises at least one of:

an airport gate conflict constraint optimization, a push-out conflict constraint optimization, a conflicting airport gate constraint optimization or a piecewise linear transforming bridge docking rate of an airline.

8. The method according to claim 7, wherein the solving the optimized integer programming model comprises:

solving the optimized integer programming model using a branch and bound method.

9. An apparatus for outputting information, comprising:
at least one processor; and
a memory storing instructions, the instructions when executed by the at least one processor, cause the at least one processor to perform operations, the operations comprising:

acquiring flight information, airport gate information, taxiway information and a taxiing path;

constructing an integer programming model according to the flight information, the airport gate information, the taxiway information and the taxiing path, the integer programming model comprising a target, a decision variable and a constraint;

optimizing the integer programming model according to the constraint;

solving the optimized integer programming model to obtain a corresponding relationship table of flights and airport gates, and outputting the corresponding relationship table;

selecting, in response to receiving an adjustment request of a target flight, several airport gates randomly, and adding the airport gates to a rearrangement list;

adding to the rearrangement list, an airport gate that conflicts with the randomly selected airport gates, in the corresponding relationship table of flights and airport gates;

constructing a local integer programming model according to airport gate information involved in the arrangement list and related flight information, the taxiway information and the taxiing path;

solving the local integer programming model to obtain an optimal solution within a local range, and updating the corresponding relationship table of flights and airport gates; and adjusting a position of an aircraft in the airport according to the updated corresponding relationship table.

10. The apparatus according to claim 9, the operations further comprising:

assigning an airport gate to a flight not assigned with an airport gate by means of a greedy algorithm.

11. The apparatus according to claim 9, the operations further comprising:

evaluating an effect of the corresponding relationship table of flights and airport gates.

12. The apparatus according to claim 9, wherein the decision variable comprises at least one of:

an identifier for indicating occupation of an airport gate by a flight, a flight push-out conflict identifier, a completion rate of a target bridge docking rate of an airline, a taxiway occupation identifier, a flight attribute, an airport gate attribute, a flight arrival time, a flight departure time, a flight pick-up start time, a flight pick-up end time, a flight drop-off start time, a flight drop-off end time, an identifier of a near airport gate, a number of passengers on board, a pick-up/drop-off conflict identifier, a distance between an airport gate and a runway, an identifier of a temporary airport gate, a target bridge docking rate identifier of an airline or an identifier of a conflicting airport gate.

13. The apparatus according to claim 12, wherein the constraint comprises at least one of:

an attribute constraint, a VIP flight constraint, a space constraint, a time constraint, a conflicting airport gate constraint, a pick-up/drop-off conflict constraint or a push-out conflict constraint.

14. The apparatus according to claim 13, wherein the target is a weighted sum of at least one of:

a bridge docking rate of a flight, a bridge docking rate of a passenger, a bridge docking completion rate of an airline, a push-out conflict rate, a taxi distance rate, a time usage rate of a near airport gate or a usage rate of a temporary airport gate.

15. The apparatus according to claim 13, wherein the optimizing the integer programming model according to the constrain comprises at least one of:

an airport gate conflict constraint optimization, a push-out conflict constraint optimization, a conflicting airport gate constraint optimization or a piecewise linear transforming bridge docking rate of an airline.

16. The apparatus according to claim 15, wherein the solving the optimized integer programming model comprises:

solving the optimized integer programming model using a branch and bound method.

17. A non-transitory computer readable medium, storing a computer program, wherein the computer program, when executed by a processor, causes the processor to perform operations, the operations comprising:

acquiring flight information, airport gate information, taxiway information and a taxiing path;

constructing an integer programming model according to the flight information, the airport gate information, the taxiway information and the taxiing path, the integer programming model comprising a target, a decision variable and a constraint;

optimizing the integer programming model according to the constraint;

solving the optimized integer programming model to obtain a corresponding relationship table of flights and airport gates, and outputting the corresponding relationship table;

selecting, in response to receiving an adjustment request of a target flight, several airport gates randomly, and adding the airport gates to a rearrangement list;

adding to the rearrangement list, an airport gate that conflicts with the randomly selected airport gates, in the corresponding relationship table of flights and airport gates;

constructing a local integer programming model according to airport gate information involved in the arrangement list and related flight information, the taxiway information and the taxiing path;

solving the local integer programming model to obtain an optimal solution within a local range, and updating the corresponding relationship table of flights and airport gates; and adjusting a position of an aircraft in the airport according to the updated corresponding relationship table.

\* \* \* \* \*